June 30, 1964   L. N. BRAMLEY ETAL   3,139,569
CONTROL SYSTEM FOR CONTROLLING A MANIPULATOR FOR MOVING INGOTS
Filed Nov. 12, 1959   7 Sheets-Sheet 3

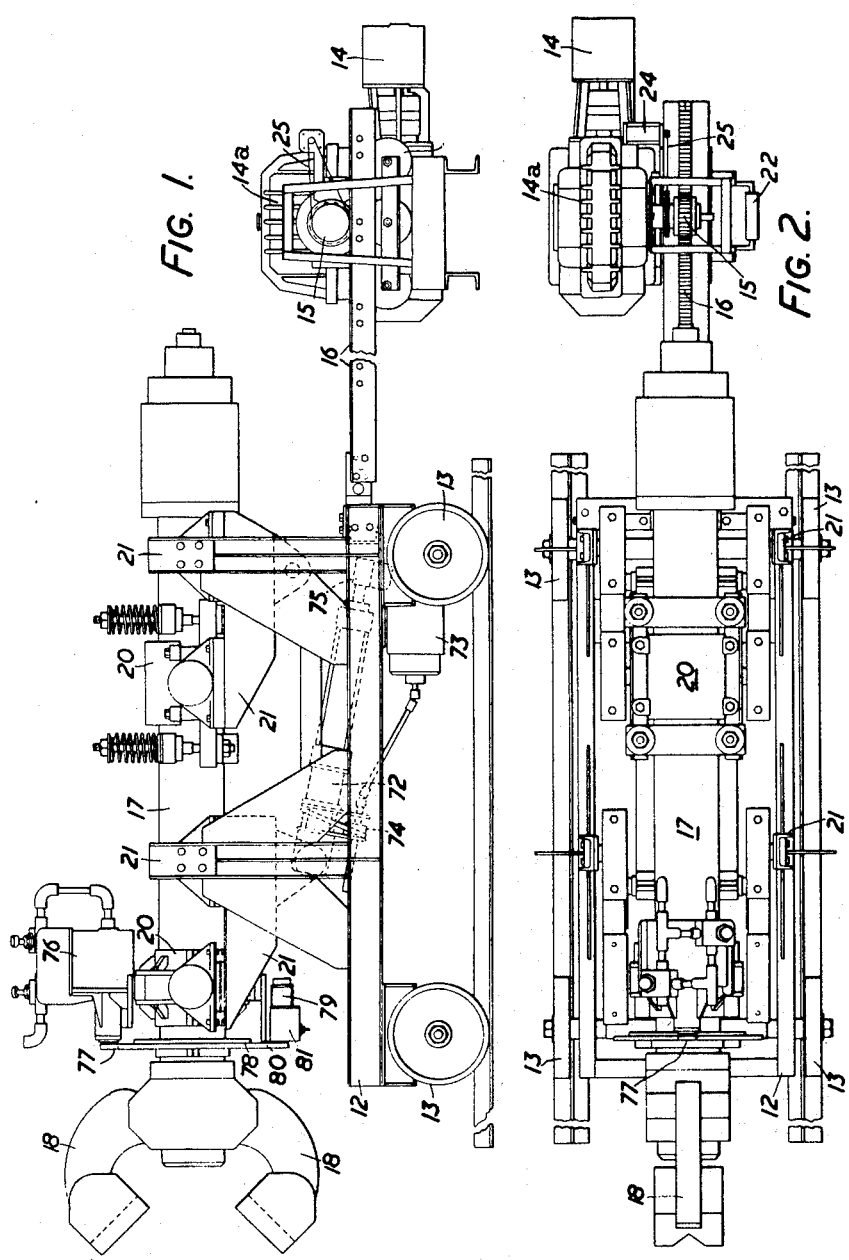

INVENTORS
LIONEL NAPIER BRAMLEY AND WALTER NORMAN JENKINS
LEONARD JAMES CHANT AND FRANCISZEK SEREDYNSKI
BY
Hane and Nydick
ATTORNEYS INVENTORS
LIONEL NAPIER BRAMLEY AND LEONARD JAMES CHANT
WALTER NORMAN JENKINS AND FRANCISZEK SEREDYNSKI
BY
Hane and Nylink
ATTORNEYS

United States Patent Office 3,139,569
Patented June 30, 1964

3,139,569
CONTROL SYSTEM FOR CONTROLLING A MANIPULATOR FOR MOVING INGOTS
Lionel Napier Bramley, London, England, Walter Norman Jenkins, Sketty, Swansea, Wales, and Leonard James Chant and Franciszek Seredynski, London, England, assignors to The British Iron and Steel Research Association, London, England
Filed Nov. 12, 1959, Ser. No. 852,272
5 Claims. (Cl. 318—28)

This invention relates to the forging, especially of the ferrous objects and particularly relates to control circuits for manipulators which are used for moving ingots between successive forging operations.

Figure 3A:
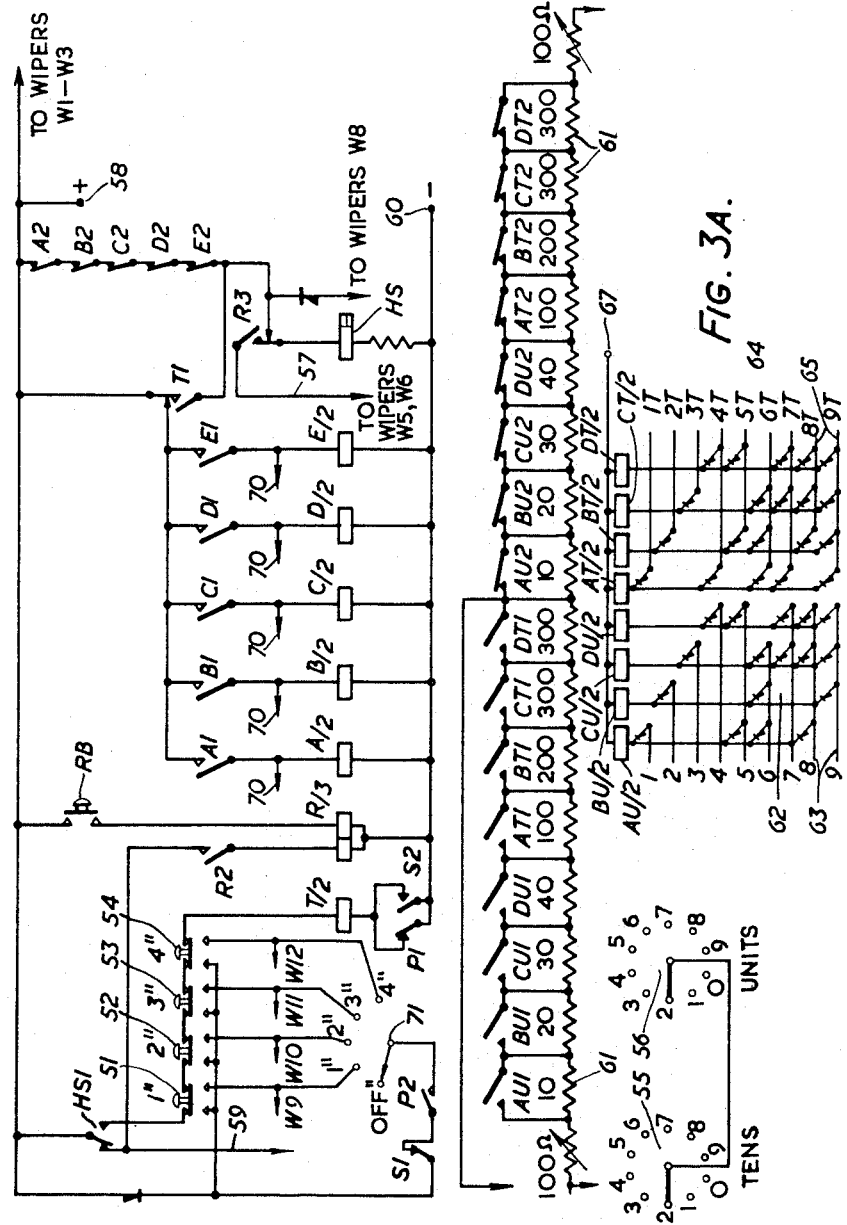
Figure 3B:
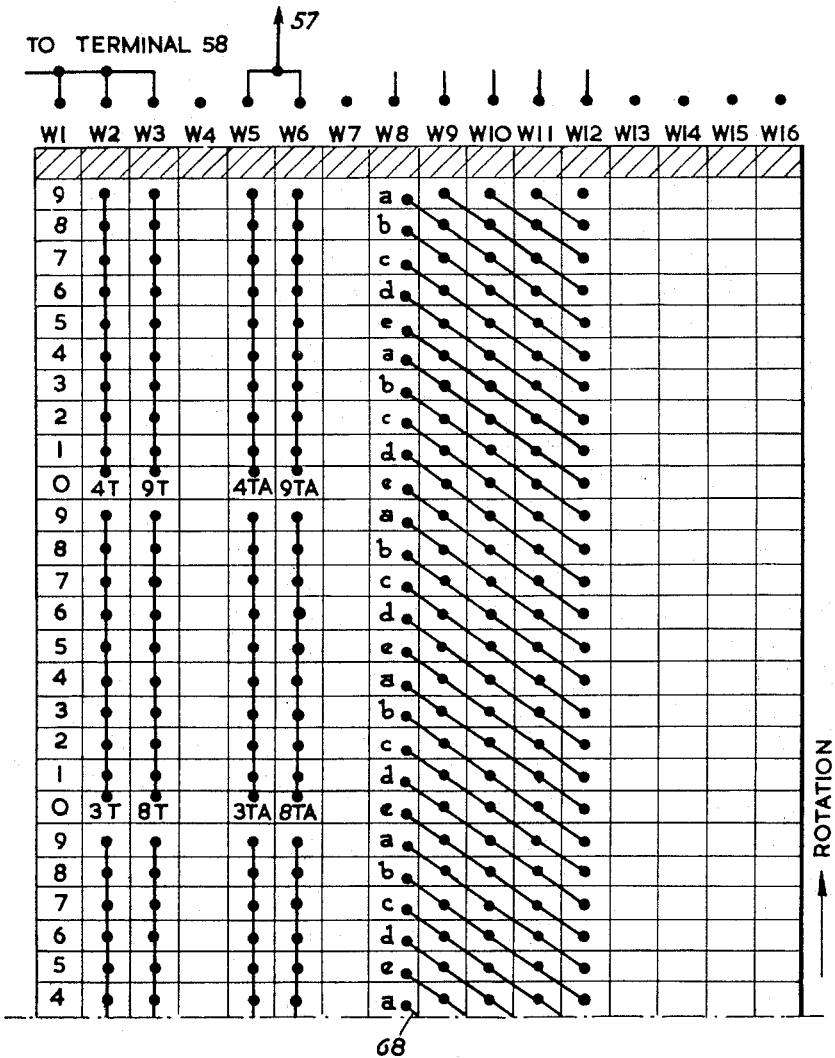
Figure 3C:
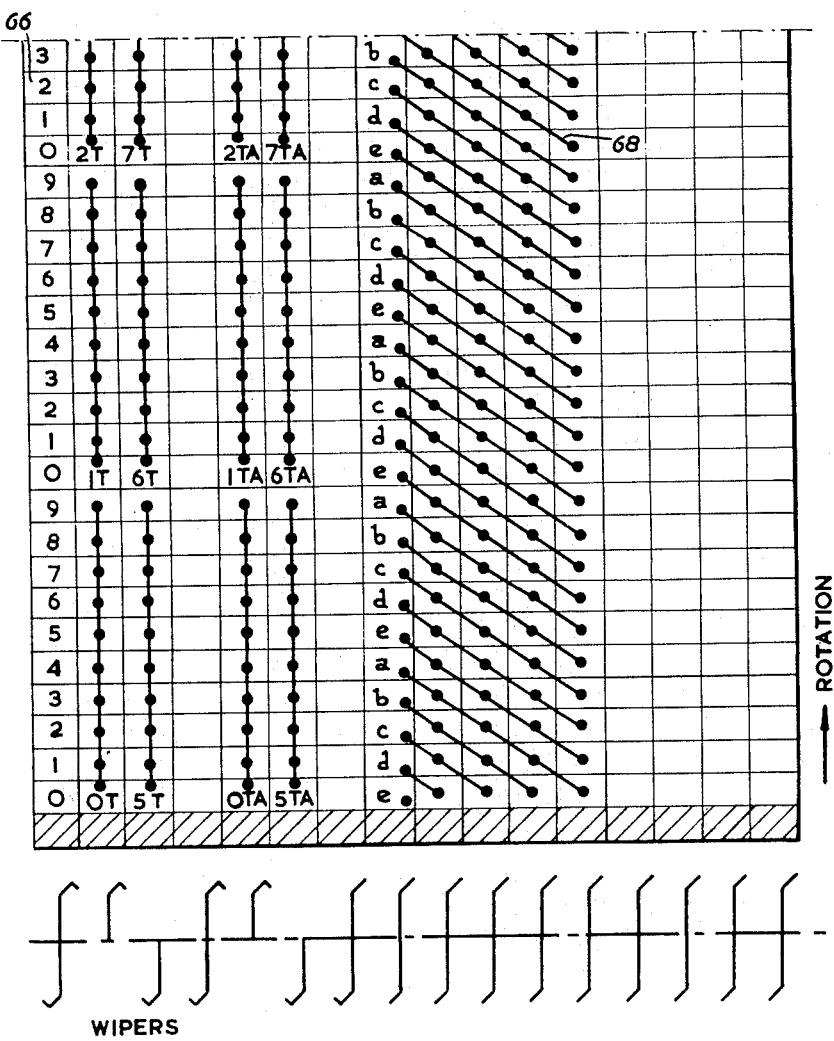
Figure 4:
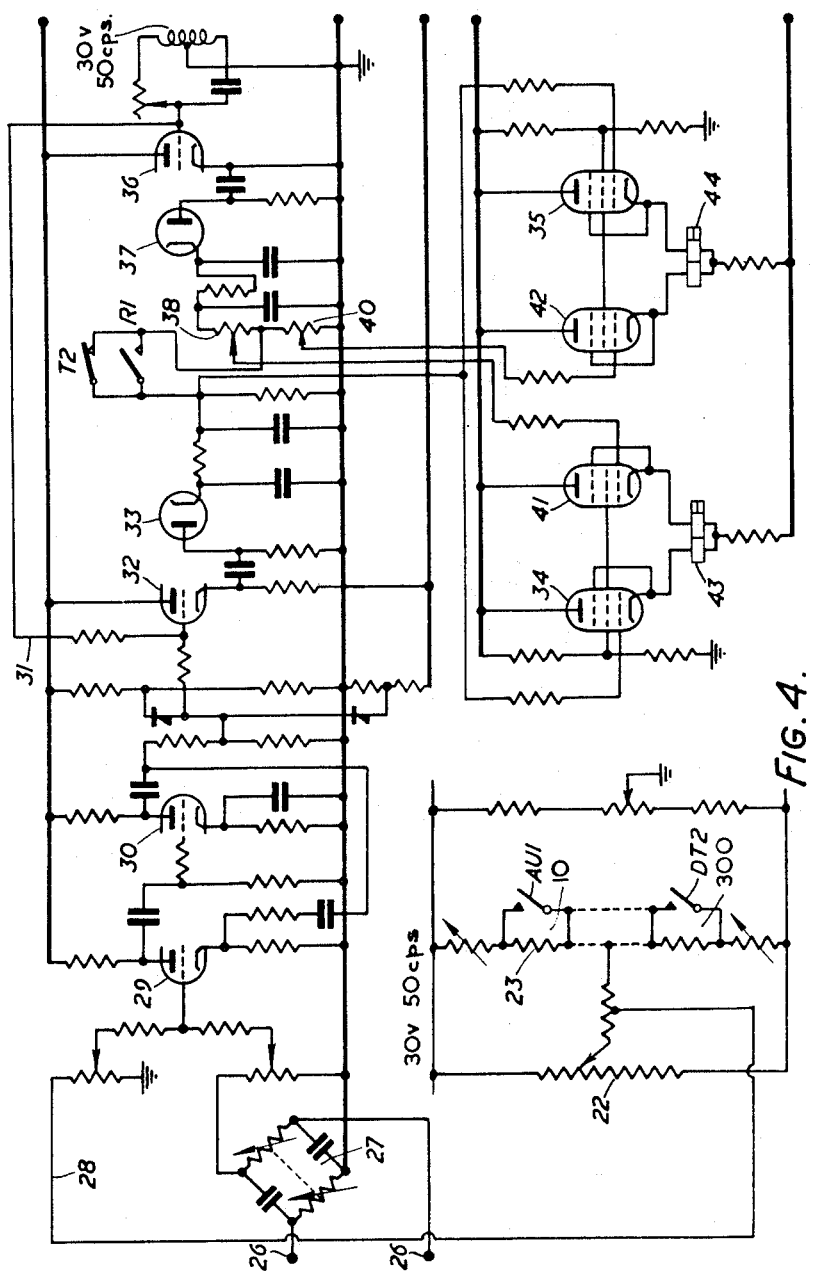
Figure 5:
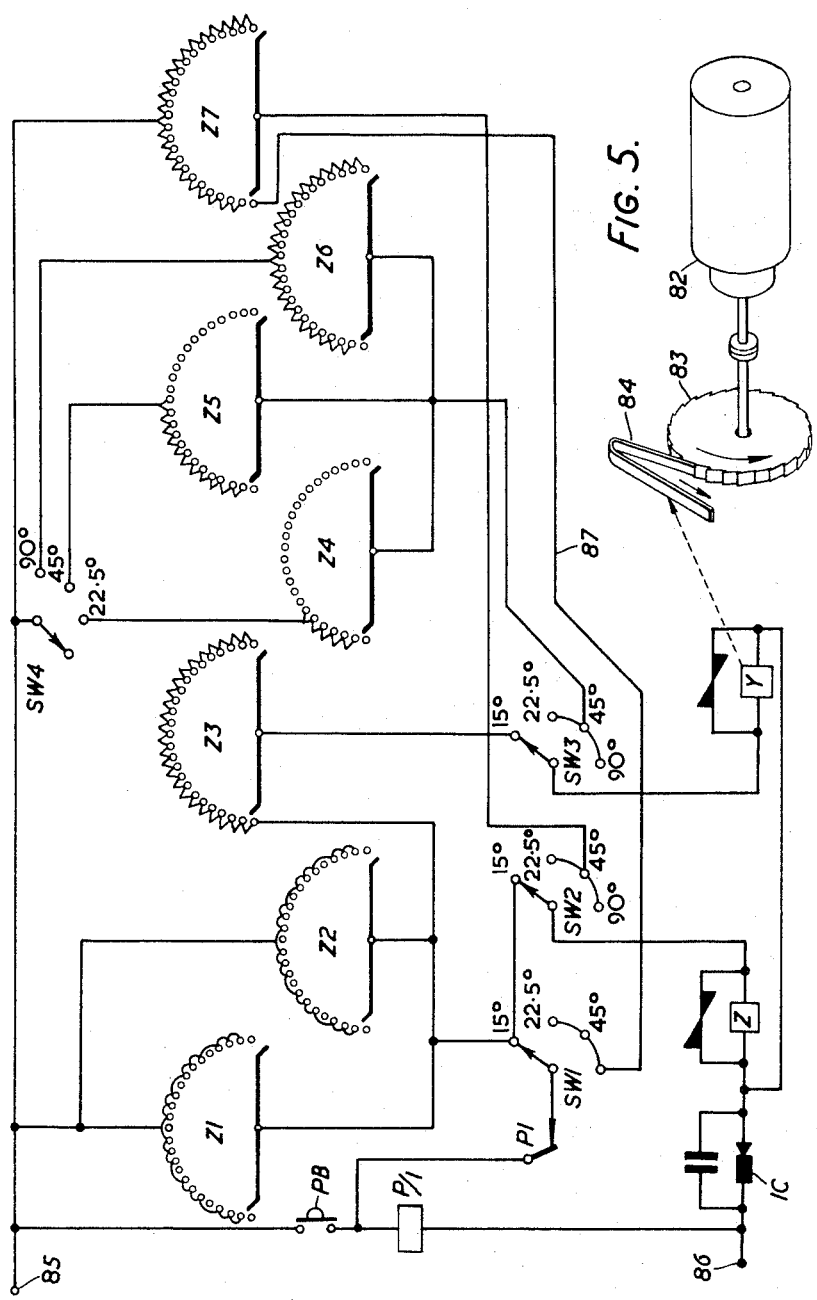
Figure 6:
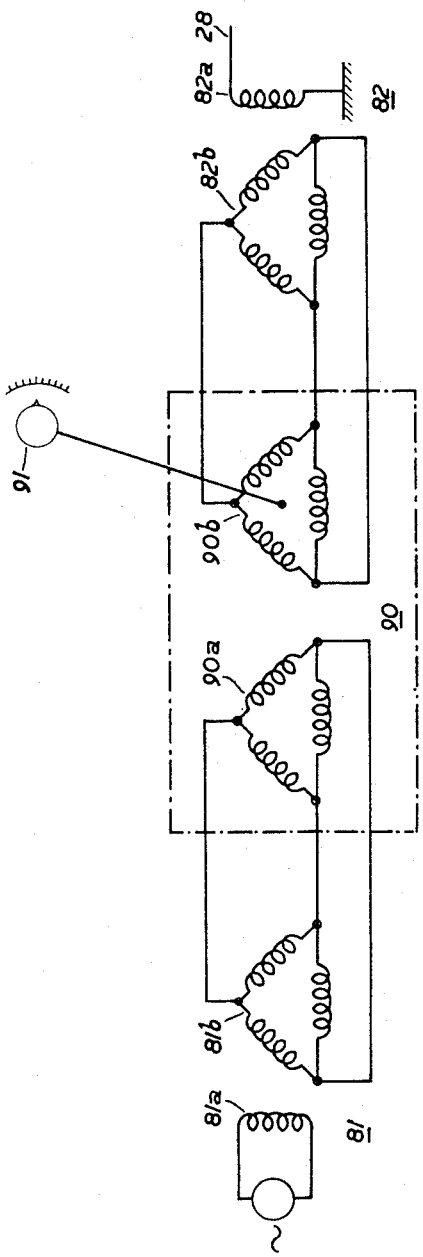

The invention will be understood from the following description of an example of circuits for controlling the movements of the manipulator described in specification No. 7,398/58. Reference is made to the accompanying drawings, in which:

FIGURES 1 and 2 are a side view and an end view respectively of the manipulator, FIGURES 3A, 3B and 3C together form a circuit diagram of the error detection circuit for the longitudinal position of the manipulator, FIGURE 4 is a circuit diagram of the setting circuit for longitudinal position of the manipulator, FIGURE 5 is a circuit diagram of the setting control circuit for the rotational position of the peel of the manipulator, and FIGURE 6 illustrates the circuit of the synchros used in the setting of the peel.

Referring to FIGURES 1 and 2, the manipulator comprises a carriage 12 mounted on wheels 13 and driven by a stationary motor 14. The motor 14 drives through a gear box 14a having a pinion 15 on its output shaft engaging with the teeth of a rack 16 which is attached to the carriage 12. The manipulator which is described in more detail in British patent specification No. 7,398/58 has a peel 17 carrying at one end a pair of jaws 18 for holding an ingot to be forged.

As well as being capable of movement longitudinally on the wheels 13, the peel 17 can move vertically with respect to the carriage 12 and rotationally about its own axis. Rotational movement is achieved by bearings 20 which support the peel rotationally. Vertical movement is achieved by a pair of links 21 which are pivoted to the bearings 20 and to stanchions 21 secured to the chassis 12.

The circuit for controlling the manipulator longitudinally is shown in FIGURES 3 and 4. Referring first to FIGURE 4, a voltage is developed in accordance with the position of the manipulator, by means of a ten-turn potentiometer 22 mounted on the output shaft of gear box 14a (see FIGURE 2). The voltage from potentiometer 22 is opposed to the voltage from an input potentiometer shown generally at 23. Potentiometer 23 is selectively operated in the manner to be described in accordance with the digital value of the desired position of the manipulator. The output shaft of gear box 14a also drives a tacho-generator 24 through a chain drive 25 and the output of the tacho-generator is applied to the input terminals 26 (FIGURE 4).

Both the potentiometers 22, 23 and the tacho-generator 24 are supplied with the same alternating voltage. The error signal, which is proportional to the difference in voltage obtained from the potentiometers 22, 23 is applied on line 28 and is combined with the tacho-generator output voltage on line 26, after passing through the bridge circuit 27. The combined signal is applied to a two-stage amplifier 29, 30 and the amplified signal is biased by an A.C. reference voltage on line 31, derived from the same A.C. source as that supplying the potentiometers 22, 23. The biased signal is applied to a cathode follower 32 and then to a rectifying diode 33. The rectified voltage is smoothed and is applied to the control grids of two pentodes 34, 35.

The bias voltage on line 31 is also applied to a cathode follower 36, is rectified by a diode 37 and smoothed, the smoothed output appearing across two potentiometers 38, 40 in series. The sliders of potentiometers 38, 40 are connected to the control grids of two further pentodes 41, 42 respectively. Each of the pentodes 34, 41 is connected in series with one winding of a relay 43 controlling movement of the manipulator in the forward direction. The windings of relay 43 are differentially wound. Similarly, each of pentodes 35, 42 is connected in series with one winding of a relay 44 which controls movement of the manipulator in the reverse direction.

When the manipulator is at approximately the correct position, as set by the input potentiometer 23, the voltage applied to the control grids of pentodes 34, 35 lies between the voltages on the sliders of the potentiometers 38, 40. Under these conditions, the current passed by pentode 41 exceeds that passed by the pentode 34 and the relay 43 remains in its off position. At the same time, the current through pentode 35 exceeds that through pentode 42 and, similarly, relay 44 is in its off position. If the manipulator is in a position rearward of the position set by the potentiometer 23, the voltage applied to pentodes 34, 35 exceeds the voltage from potentiometer 38; as a result, more current is passed by pentode 34 than pentode 41 and relay 43 is changed to its on position to cause operation of the motor 14 (FIGURE 1) in the forward direction. However, the current through pentode 35 still exceeds that through pentode 42 and relay 44 remains off. If the manipulator is in a position forwardly of the position set by potentiometer 23, then the voltage applied to pentodes 34, 35 is less than that supplied by potentiometer 40 and, as a result, more current is passed by pentode 42 than is passed by pentode 35 and relay 44 is changed to its on position to cause the motor 14 to drive the manipulator in the forward direction. However, relay 43 remains de-energised.

The motor 14 is a hydraulic motor and the relays 43, 44 control valves, in turn controlling the forward and reverse operations of the motor.

FIGURES 3A, 3B and 3C illustrate the circuit for setting the input potentiometer 23 (FIGURE 4). For convenience, this potentiometer is also shown in FIGURE 3A. The circuit includes a Post Office motor uniselector which is shown in two parts in FIGURES 3B and 3C, these figures being designed to be read with FIGURE 3B above FIGURE 3C. The stator of the uniselector is shown in expanded form, the different levels being shown as different columns, and the wipers being illustrated beneath the stator in FIGURE 3C. The connections to the wipers are shown, for the sake of simplicity, at the top of the stator in FIGURE 3B and are numbered W1 to W16. Furthermore, the way in which the stator contacts are connected together is illustrated in the drawing; thus, in the levels corresponding to wipers W8 to W12 the contacts are connected diagonally, the first contact in level 12 being connected to the second contact in level 11, to the third contact in level 10 and so on.

The circuit of FIGURE 3 is designed to cause the manipulator to move rearwardly through fixed distances of 1, 2, 3 or 4 inches on appropriate operation of the push buttons 51, 52, 53, 54 respectively. Furthermore, the manipulator can be reset after each rearward movement by appropriately setting a "tens" rotary switch 55 and a units rotary switch 56 and by pressing a reset button RB.

Considering first the control of the manipulator to a position set by the setting of switches 55, 56, the wipers of the motor uniselector are normally kept stationary by the energisation of the high speed relay HS of the uniselector through closed contacts T1. On operation of the reset button RB, relay R is energised and the contacts R3 change over to disconnect relay HS from contacts T1 and to connect relay HS to line 57 leading to wipers W5, W6. Relay HS is de-energised and changes over its contacts HS1, thereby de-energising relay T and establishing a holding circuit for relay R through the closed contacts R2. When the relay HS is de-energised, the latch coil (not shown) of the uniselector is energised through contacts HS1 and line 59 and the motor uniselector continues to move until relay HS is again energised. This will occur when the wipers of the uniselector have stepped to a position corresponding to the setting of switches 55, 56, the stationary contacts of which are selectively connected to the contacts in levels W5, W6 and W1 respectively in the manner indicated in FIGURES 3B, 3C. Thus, the "0" contact of switch 55 is connected to the first then contacts 0TA in level W5, contact "1" is connected to the next ten contacts 1TA in the same level and so on. The contact positions in level 1 have been numbered according to the number of the stationary contacts of switch 56 to which they are connected.

When the wipers of the uniselector have stepped to a position where the contact in level 5 or level 6 is connected to the selected contact of switch 55 and the contact in level 1 is connected to the selected contact of switch 56, a circuit is completed from the + positive supply terminal 58 (FIGURE 3A), through the wiper W1 (FIGURE 3B), the stationary contact in that level, the switch 56, switch 55, the connected contact in level 5 or level 6, wiper W5 or W6, line 57, closed contacts R3, and high speed relay HS, to the −50 volt terminal 60. The high speed relay HS is therefore energised, contacts HS1 change over and prevent further stepping of the uniselector, relay T is re-energised, relay R is de-energised and the hold circuit for relay HS re-established through contacts R3.

The position at which the wipers of the motor uniselector are stopped determines the setting of the potentiometer 23. As shown, this potentiometer consists of two chains of resistors 61 connected in series across the A.C. supply, each chain consisting of eight resistors having the values 10, 20, 30, 40, 100, 200, 300 and 300 ohms successively. The resistors of the first chain can be individually short circuited by the contacts AU1–DU1 and AT1–DT1 of relays AU, BU, CU, DU, AT, BT, CT and DT. Similarly, the resistors of the second chain can be individually short circuited by contacts AU2–DU2 and AT2–DT2 of the same relays. The contacts of the first chain are normally open while those of the second chain are normally closed; as a result, the total resistance of the two chains is unaltered by the operation of any of the relays. The relays AU–DU are selectively energised through a diode matrix 62 by the lines 63 which are numbered according to the units value it is desired to select and which are connected to the correspondingly numbered contacts in level 1 of the uniselector. Similarly, relays A2–DT are selectively energised through a second matrix 64 by nine lines 65 which are numbered 1T–9T corresponding to the "tens" value to be selected and which are connected to the correspondingly numbered contacts in the second and third levels of the uniselector. When the wipers stop at a prescribed position on the uniselector, the relays AU–DT are selectively energized to select a voltage on the connecting point of the two chains of resistors, dependent on the position of the wipers. If, for example, 22 inches has been selected by operation of the switches 55, 56 and the reset button RB has been operated, the wipers will stop at the position indicated at 66 on the uniselector chart and with the wiper W2 in contact with the contact in level 2 at position 66; wiper W3, like wiper W2, is single ended and will not be in engagement with any of the indicated contacts. A circuit will then be completed from the positive terminal 58 through wiper W1, contact "2" in level 1 at position 66, the line 63 numbered "2," and relay BU to the negative supply terminal 67. Another circuit is completed from positive terminal 58, through wiper W2, the contact in level 2 of the uniselector, line 2T, and relay BT to the negative terminal 67. As a consequence, contacts BU1 and BT1 will be closed and contacts BU2 and BT2 opened to change the potential of the centre point of the resistor chains by an amount proportional to 22.

Relay T has normally closed contacts T2 and relay R has normally open contacts R1 connected in parallel between the common connecting point of resistors 38, 40 (FIGURE 4) and the control grids of pentodes 34, 35. When either contacts T2, R1 are closed, grid voltages to the pentodes 34, 35 is locked and prevent operation of motor 14 (FIGURE 1). Operation of press-button RB energises relay R so that motor 14 is rendered inoperative until potentiometer 23 has been brought to its new setting and relay R de-energised. In this way, the manipulator is prevented from attempting to follow the changes in the resistance of potentiometer during setting of the latter.

Turning now to the operation of the manipulator under control of the push buttons 51–54, the actuation of any of these buttons opens the circuit to relay T. Relay T is de-energised and closing of its contacts T2 locks the grid voltages of pentodes 34, 35 as before. Relay HS remains energised through contacts A2–E2, but contacts T1 open as shown to connect contacts A1–E1 to positive terminal 58. Actuation of the push button also connects the positive terminal 58 to one of the wipers W9–W12. Suppose, for example, that the press button 52, corresponding to a movement of two inches, is operated and that, before operation, the wipers of the uniselector are at position 66. The diagonal connection 68 will then be energised through the closed contacts of button 52, wiper W10 and the contact in level 10 and position 66 of the uniselector. The diagonal connections are referenced successively and repetitively $a$, $b$, $c$, $d$ and $e$, as indicated, and all those connections referenced $a$ are connected through the line 70 to relay A. Similarly all connections referenced $b$, $c$, $d$ and $e$ are connected through similar lines 70 to relays $b$, $c$, $d$ and $e$ respectively. Thus in the example taken, positive potential will be applied through the diagonal connection 68 to relay A, the energisation of which causes contact A1 to close and to establish a holding circuit to relay A and, through line 70, to the diagonal connection 68. At the same time contacts A2 open and de-energise relay HS. As before, the uniselector wipers step over the contacts until the high speed relay HS is re-energised; this occurs when wiper W8 engages a contact of the uniselector which is held positive through contacts A1 and the connected line 70. Thus, the wipers will move two positions so that wiper W8 engages with the contact in level 8 connected by the diagonal connection 68. On re-energisation of relay HS, contacts HS1 change over and cause relay T to be energised and a holding circuit for relay HS to be established through contacts T1. Simultaneously, relay A is de-energised by the closing of contacts T1. As will be readily understood from the foregoing description, the movement of the wipers through two steps changes the connections to the matrices 62, 64 and thereby the selective operation of contacts AU1–DT1 and AU2–DT2, so that the manipulator moves backwardly through two inches.

Exactly the same operation is performed when one of the other push buttons 51, 53, 54 is actuated. However, the number of steps effected by the wipers of the uniselector differs in each case, according to which wiper W9, W11, W12 is energised.

The incremental setting of the manipulator by the selective energisation of wipers W9–W12 may alternatively be controlled through a rotary switch 71. When this switch is moved from "OFF," to the two inches setting, for example, and the contacts S1, S2, P1, P2 operated, one of the lines W9–W12 is pulsed and the apparatus operates as described to withdraw the manipulator through two inches. The contacts S1, S2, P1, P2 may be contacts of relays operated by the forging press so that the movement of the manipulator is interlocked with the press.

For the control of vertical motion of the peel 17, a hydraulic cylinder 72 which raises or lowers the ingot incorporates a continuous servo system, in that movement of its ram is proportional to movement of its pilot valve, a direct connection between ram and pilot valve providing feedback.

The pilot valve is coupled to an electric motor 73 by a nut and screw-type gearing 74 and control of this motor is by an on-off electrical system similar to those previously described. In this case, potential dividers are used for position setting and position detecting, and electronically operated relays (not shown) control the direction of motion of the electric motor. This in turn moves the pilot valve, and the ram, following up, raises or lowers the ingot.

The position detecting potential divider 75 is rotated by rack and pinion drive from the ram, and the input potential divider is scaled 0–8 inches (the lifting range). Rotation of the input potential divider is followed by a corresponding movement of the manipulator. A tacho-generator (not shown) is geared to the electric motor to provide a velocity feedback signal. Accuracy is about $\pm \frac{1}{16}''$, and the 8″ range can be traversed in 2 seconds.

The input setting unit for vertical motion is a simple manually set rotary potential divider, similar to those used in the press control circuit of specification No. 33,230/56. The error signal operating the control is the difference voltage between the slider of this input potential divider and the slider of a similar potential divider geared to the vertical motion hydraulic cylinder.

The peel 17 is rotated by a hydraulic motor 76 (FIGURE 1) through a pinion 77 and a meshing gear wheel 78 secured to the peel. Gear wheel 78 also meshes with a pinion 80 on the shaft of a synchro 81 which also drives a tacho-generator 79.

The motor 76 is controlled by solenoid-operated valves, which are in turn controlled by relays similar to relays 43, 44 of FIGURE 4. Control of these relays is effected by a setting synchro 82 (FIGURE 5), the output of which depends on the angular difference between it and synchro 81 and is applied to terminal 28 of a circuit generally similar to that of FIGURE 4, but omitting the contacts T2, R1. The tacho-generator output is applied to line 26 as before, as in the case of longitudinal control, when the error signal, representing a different setting of the synchro 81 with respect to the synchro 82, falls outside the dead band set by the potentiometers 38, 40, relay 43 or 44 is operated to cause the hydraulic motor 76 (FIGURE 1) to drive the peel until the error between the two synchros is reduced substantially to zero.

Both the output synchro 81 and the setting synchro 82 have single phase rotor windings 81a, 82a, and three phase delta stator windings 81b, 82b, as shown diagrammatically in FIGURE 6. There is additionally a differential synchro 90 having three phase stator and rotor windings 90a, 90b. The rotor of synchro 90 can be turned relative to the stator by the adjustable dial 91. Rotor winding 81a is connected to the reference source of alternating current, windings 81b, 90a are connected together as shown, as are windings 90b, 82b, while stator winding 82a is connected to line 28 of the amplifier (FIGURE 4). The initial setting of the peel is adjusted by operation of the dial 91; thereafter the peel may be rotated in a single direction only through prescribed angles by the circuit of FIGURE 5.

The circuit of FIGURE 5 is designed to cause the setting synchro 82, and hence the peel 17, to turn through any of a number of predetermined angles, which in the example given are 90°, 45°, 22½° and 15°. The shaft of the setting synchro 82 carries a ratchet wheel 83 which is driven by an electromagnetic ratchet device indicated at 84. This ratchet device 84 rotates the ratchet 83 through one tooth, each time the operating solenoid Y is pulsed. This movement of the ratchet wheel 83 is equivalent to a movement of 3¾° movement of the peel 17.

The solenoid Y is supplied with the requisite number of pulses for the required angle of movement of the peel 17 by a uniselector, the various levels of which are shown at Z1–Z7, the coil of which is shown at Z and the interruptor contacts of which are shown at IC.

The angle of movement of the peel 17 is selected by the positioning of a 4-position, multipole switch, the poles of which are shown at SW1–SW2, SW3 and SW4. When the switch SW is placed in its first position, as shown, to select an angle of 15°, and the button PB is pressed, the relay P is energised and the contacts P1 open. However, before contact P1 opens, a circuit is completed from the positive supply terminal 85, through button PB, contacts P1 switch SW1 and SW2, the uniselector coil Z and the interrupter contacts IC to the negative supply terminal 86. As a result, the uniselector rotates by one step. In levels Z1, Z2 which are connected in parallel, all the contacts are connected together, with the exception of every fourth contact. Therefore, the initial rotation of the uniselector through one step, causes the wipers in levels Z1, Z2 to be energised from the positive supply terminal 85 and to complete the circuit to coil Z and contacts IC. As a result, the solenoid Y, which is connected through switch SW3 and level Z3 in series with the wipers Z1, Z2 and the interruptor contacts IC, is supplied with four pulses and the synchro is rotated through an angle equal to four teeth of the ratchet wheel 83, i.e., 15°. After the uniselector has rotated through four steps, the wipers in level Z1, Z2 reach a contact which is not connected to terminal 85 and further stepping of the synchro stops.

When the switch SW is placed on any of the other three positions, corresponding to angles of 22½°, 45° and 90°, the coil Z and the contacts IC are pulsed through a circuit from terminal 85, button PB, contacts P1, switch SW1, a line 87, the first contact of level Z7, switch SW2, to the coil Z and contacts IC. The uniselector rotates through one step and, as the remaining contacts of level Z7 are connected to terminal 85, the uniselector continues to step through all its contacts until it returns to the first contact. The solenoid Y is connected through switch SW3 to the wipers of levels Z4, Z5, Z6. In level Z4 the second to seventh contacts are connected to switch SW4, so that when switch SW is placed in the 22½° position, six pulses are applied by level Z4 to the solenoid Y and the synchro 82 is rotated through 22½°. Similarly, when switch SW is in either the 45° or 90° position, 12 or 24 pulses, respectively, are applied to the solenoid Y and the synchro is rotated through 45° and 90° respectively.

The individual movements of the manipulator, as described above, may be linked together and with the press to get fullest efficiency of use of the forge. The time between press strokes should be no longer than that required for manipulation, and as this becomes shorter with automatic controls, small delays between one movement and the next become more important.

For example, with an operator starting each motion, a longitudinal movement would probably not be started until the press crosshead had started lifting after a forging stroke, whereas, due to the time required for the manipulator to start moving, the longitudinal motion might really need to be initiated at the end of the down stroke if no time is to be wasted. Further, rotational and longitudinal movements are sometimes required together, and the timing problem becomes even more difficult.

Sequencing of the various movements may entail automatic inception of each movement by the previous movement, or completely independent inception of each movement on a time basis.

In the case in which each movement is initiated automatically by the previous movement, the press, longitudinal and rotational controls are linked by automatic sequencing, the method being to use the relays which control any motion to start the next motion. For example, at the end of a forging up stroke a relay operates to commence the down stroke, although the crosshead does not reverse until some short time interval later. Contacts on this relay are arranged in parallel with the starting button of the rotational and longitudinal movements so that each forging stroke causes one step of longitudinal movement and one of rotation, giving a spiral forging pattern. This technique is useful in planishing round sections. Either of these movements may of course be switched off if it is not required.

In the case where each movement is initiated on a time basis, cycling is achieved by the use of a cam-operated switch for starting each of the controlled movements, the cams being driven from a common shaft at a steady speed which can be varied. Each motion operates once for each complete revolution of the cams, and by adjusting the relative position of the switches the various controls may be actuated at any required times relative to each other. The speed at which the cams rotate dictates the speed at which the sequence of events repeats itself. In some cases it is desirable that the time interval between events should remain constant with varying speed of the cycling switch and this has been arranged by gearing the switch position setting to the speed control. Thus once having set the relative timing of, say, the press up stroke and manipulator longitudinal movement, variation of the number of forging strokes per minute need not disturb the co-ordination of the movements.

We claim:

1. A manipulator control system for positionally controlling a manipulator comprising a synchro actuated by the manipulator and set according to the manipulator position, a datum synchro settable according to the desired manipulator position, a control circuit operated by the two synchros to change the manipulator position until it achieves the position to which the datum synchro is set, and setting means arranged to alter the angular setting of said datum synchro by any of a number of digitally related angles, said setting means including a pulse generator for producing a predetermined number of pulses, said pulse generator being a uniselector stepping through a predetermined but adjustable number of steps when operated and generating a pulse on each step and a rotary device connected to the pulse generator to rotate the datum synchro through a predetermined angle on each pulse.

2. A manipulator control system according to claim 1 in which the rotary device is an electromagnetically operated ratchet device coupled to the datum synchro and supplied with the pulses from the pulse generator.

3. A circuit for selectively setting a setting control device comprising a motor uniselector having the wipers and contacts in primary levels thereof connected to cause the wipers to be brought to prescribed positions, the wipers and contacts in secondary levels connected to operate the control device selectively according to the position at which the wipers are located, and wipers and contacts in tertiary levels connected to manually operated devices so that the wipers change their positions by a prescribed number of steps on operation of one such device.

4. A circuit for selectively setting a setting control device according to claim 3 in which there are connecting lines each of which connect together one contact in each of the tertiary levels, each of the mechanically operated devices are arranged, when operated, to energise the wiper of a corresponding tertiary level and one of the connecting lines, and the wiper in another of the tertiary levels is arranged to stop the uniselector when that wiper engages a contact of the energised connecting line.

5. A circuit for selectively setting a settable control device according to claim 4 in which there are a plurality of relays selectively operable to set the control device and at least one matrix for controlling the relays by the contacts in the secondary levels of the uniselector according to a prescribed code.

References Cited in the file of this patent

UNITED STATES PATENTS

| | | |
|---|---|---|
| 2,734,155 | Schuck | Feb. 7, 1956 |
| 2,769,124 | Erbe | Oct. 30, 1956 |
| 2,840,771 | Kamm | June 24, 1958 |
| 2,848,670 | Kelling et al. | Aug. 19, 1958 |
| 2,867,759 | Comstock | Jan. 6, 1959 |
| 2,889,507 | Kennedy et al. | June 2, 1959 |
| 2,922,940 | Merger | Jan. 26, 1960 |